(12) United States Patent
Dolister

(10) Patent No.: US 6,360,458 B2
(45) Date of Patent: Mar. 26, 2002

(54) RAKE ATTACHMENT FOR SKID STEER LOADERS AND FRONT END LOADERS AND METHOD FOR CONVERTING A LOADER BUCKET INTO A LAWN PREPARATION TOOL

(75) Inventor: Randy Dolister, Lee, IL (US)

(73) Assignee: Farmers' Factory Company, Lee, IL (US)

( * ) Notice: Subject to any disclaimer, the term of this patent is extended or adjusted under 35 U.S.C. 154(b) by 0 days.

(21) Appl. No.: 09/426,973

(22) Filed: Oct. 26, 1999

(51) Int. Cl.⁷ .................................................. E02F 1/00
(52) U.S. Cl. ........................... 37/195; 414/724; 37/405; 172/252; 172/253; 172/817
(58) Field of Search ........................ 37/403, 404, 405, 37/446, 449, 195; 414/724; 172/245, 247, 252, 253, 817

(56) References Cited

U.S. PATENT DOCUMENTS

| | | | | |
|---|---|---|---|---|
| 422,566 A | * | 3/1890 | Briggs ....................... 37/266 X |
| 2,285,039 A | * | 6/1942 | Lowe ........................... 37/446 |
| 2,612,280 A | * | 9/1952 | Stueland .................... 37/405 X |
| 2,993,608 A | * | 7/1961 | Womble .................... 37/405 X |
| 3,034,237 A | * | 5/1962 | Wolfe et al. .................. 37/405 |
| 3,059,357 A | * | 10/1962 | Irish ............................ 37/449 |
| 3,079,021 A | * | 2/1963 | Kohorst et al. ........... 37/405 X |
| 3,349,933 A | * | 10/1967 | Simpson et al. |
| 3,497,973 A | * | 3/1970 | Campbell .................... 37/446 |
| 3,706,388 A | * | 12/1972 | Westendorf ............... 37/405 X |
| 3,834,567 A | * | 9/1974 | Miller ...................... 37/405 X |
| 3,967,397 A | * | 7/1976 | Nault |
| 3,997,988 A | | 12/1976 | Klett ........................ 37/141 R |
| 4,271,614 A | * | 6/1981 | Albrecht ...................... 37/103 |
| 4,303,507 A | * | 12/1981 | Smith |
| 4,317,299 A | | 3/1982 | Funk ......................... 37/141 T |
| 4,729,180 A | * | 3/1988 | Hendricks |
| 4,865,372 A | * | 9/1989 | Gabriel ......................... 294/49 |
| 5,413,181 A | | 5/1995 | Keigley ...................... 172/253 |
| 5,425,189 A | * | 6/1995 | Anderson et al. ............. 37/405 |
| 5,515,625 A | | 5/1996 | Keigley ......................... 37/405 |
| 5,664,348 A | * | 9/1997 | Omann |
| 5,806,605 A | * | 9/1998 | Keigley ...................... 172/145 |

OTHER PUBLICATIONS

Bobcat 700 C–Series Skid–Steer Loaders brochure, pp. 1–14, Dec. 1995.*

FFC Brochure showing Construction, Multi–Purpose Buckets and Heavy Duth Tooth Bars.

* cited by examiner

Primary Examiner—Victor Batson
(74) Attorney, Agent, or Firm—Leydig, Voit & Mayer, Ltd.

(57) ABSTRACT

A rake attachment and a bucket attachment incorporating the same, the rake attachment generally comprising a plate, a plurality of apertures in the plate and a plurality of teeth. The elongate plate has a plurality of mounting holes extending therethrough and a plurality of integrally formed teeth projecting therefrom. The entire rake attachment is formed from a unitary plate of material to provide strength and durability. The rake attachment is designed to be fixed to the bucket attachment of a loader. Different bucket attachments are produced by various manufacturers and each have differently spaced apertures extending through a lower lip of the bucket. The rake attachment features a plurality of holes that can be combined into many different sets, each set corresponding with the spaced apertures of a specific manufacturer's bucket attachment. As such, one rake attachment can be used with a variety of different bucket attachments for loaders. A method of converting a bucket into a rake attachment is provided that greatly increases the versatility of the bucket without being cost prohibitive.

14 Claims, 4 Drawing Sheets

RAKE ATTACHMENT FOR SKID STEER LOADERS AND FRONT END LOADERS AND METHOD FOR CONVERTING A LOADER BUCKET INTO A LAWN PREPARATION TOOL

FIELD OF THE INVENTION

The present invention relates generally to skid steer loaders and front end loaders, and more particularly relates to ground preparation attachments for such loaders.

BACKGROUND OF THE INVENTION

Skid steer loaders and front end loaders are commonly used vehicles for many industrial, agricultural, and landscaping operations. There are a variety of companies that manufacture and sell such loaders. Skid steer loaders and front end loaders both typically have two laterally spaced loader arms mounted on the vehicle that swing upwardly and downwardly. When the arms are down, their forward ends extend downwardly in front of the vehicle. A mounting plate is supported on the forward ends of the loader arms. A mounting structure is typically attached to the plate and in turn supports and facilitates further attachments. A number of attachments can thus be coupled to the ends of the loader arms to make the loaders applicable to many different types of applications. For example, a bucket is commonly provided for ground preparation activities such as excavating, dumping, surface digging, leveling, and transporting. Similarly, the loaders can be adapted through various attachments to act as a forklift, back hoe, ground preparator, and the like.

One such attachment is disclosed in U.S. Pat. No. 5,413,181, where the attachment can be used for tasks such as grading or scarifying. The device includes several surface engaging members, including a mounting saddle and a rake blade. The rake blade is mounted to a forward support member which in turn is connected to the mounting saddle by a pair of spaced side support members. The mounting saddle can be used to push and level soil, and mounts to the mounting plate fixed to the skid steer loader arms. While this attachment permits grading and scarifying, it does not support excavating, dumping, or transporting as buckets do. This type of product has also not met with much commercial success because it requires the purchase of a new implement which is often cost prohibitive.

Buckets have also been developed where the bucket includes teeth that are typically made from forged bars of steel and typically welded to the bucket, such as that shown in U.S. Pat. No. 4,317,299. The teeth are helpful in breaking up hard soil, clay or rock when digging and excavating. However, buckets with permanent teeth are not always practical. Some tasks are preferably completed without the teeth.

Various devices have attempted to utilize individual teeth assemblies for attachment to a bucket. For example, U.S. Pat. No. 4,729,180 discloses an attachment to a bucket that includes teeth mounting posts spaced intermittently along the bucket for receiving individual attachable teeth. While this type of device permits use of the bucket without teeth, it too has drawbacks. One is that the attachment of the individual teeth to existing buckets can be rather complicated and require numerous parts for proper mounting. Often, a specialized bracket is required to attach the individual teeth to the bucket.

SUMMARY OF THE INVENTION

In light of the above, a general object of the present invention is to provide a lawn preparation attachment that is more practical and economical than the prior art.

In that regard, it is also an object according to one aspect of the present invention to provide a single rake attachment that can be affixed to a variety of different bucket attachments from different manufacturers.

It is a further object of the present invention to accomplish these objectives without being cost prohibitive.

In view of these and other objects of the invention, the present invention is directed towards a rake attachment for attachment to a bucket and a bucket implement incorporating the same. The rake attachment can quickly and easily be installed directly on a bucket for a loader. The rake attachment is durable and easily converts the bucket to a rake type lawn preparation tool. The bucket with a rake attachment provides a lawn preparation implement and is very inexpensive in comparison to other comparable prior art lawn preparation attachments.

The rake attachment generally includes an elongate plate having teeth projecting along a longitudinal edge of the plate. The plate includes a plurality of mounting holes to facilitate mounting the rake attachment to a bucket. Thus, the rake attachment generally has a length substantially corresponding with the width of the bucket to which it is to be affixed. A plurality of nuts and bolts may be used to secure the rake attachment to the bucket via the aligned apertures and holes in the bucket and the rake attachment.

It is a feature of the present invention that the rake attachment has universal mounting holes to facilitate attachment to a variety of buckets from different commercial manufacturers. The holes are spaced such that they form sets of hole combinations, each set corresponding with preexisting and predetermined holes built into bucket attachments for skid steer loaders. Thus, the rake attachment may be designed to be capable of attaching to numerous buckets from different manufacturers.

These and other object and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
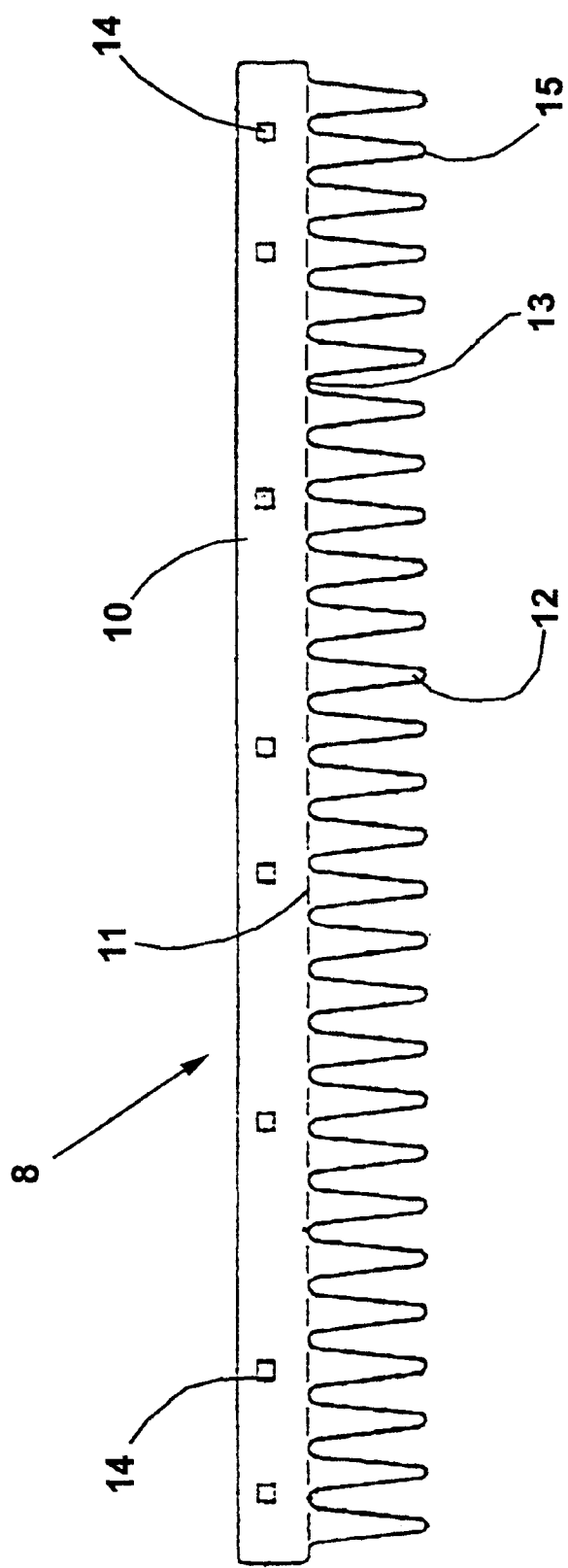
FIG. 1 is a top view of the rake attachment according to the present invention.

Referring now to the drawings, FIG. 1 shows a preferred embodiment of the present invention. The rake attachment 8 generally comprises an elongate plate 10. The elongate plate 10 has a top surface 9, a bottom surface 39, and a plurality of mounting holes 14 extending through the plate 10. FIG.

1 shows the holes 14 having a square shape, however, circular or any other suitable shape or size of holes 14 may be employed in conjunction with the present invention. The mounting holes 14 may also include a countersink 44 (shown in FIG. 5) as will be described in further detail below. The mounting holes 14 are spaced along the length of the plate 10. The length of the plate 10 corresponds generally with the width of the bucket, and in the preferred embodiment is generally around six feet. The plate also has width in the preferred embodiment of approximately eight to ten inches, and a thickness of about ½ inch to provide sufficient strength for enduring continuous raking engagement with a soil surface.

A plurality of teeth 12 project along a longitudinal edge 11 of the plate 10. The teeth 12 have radiused points 15. Between adjacent teeth 12, are radiused troughs 13 which connect the adjacent teeth 12. In the preferred embodiment, the rake attachment 8 has approximately four to five teeth per foot. The teeth generally project from the plate 10 approximately five to six inches, and have the same thickness as the plate 10. While the aforementioned dimensional ranges for the rake attachment 8, particularly the length, teeth per foot and tooth length, are the preferred ranges for a rake attachment for a skid steer loader, the present invention can be employed with dimensions outside of these preferred ranges.

The entire rake attachment 8 is cut from a unitary plate of solid steel material in a single plasma cutting operation. This method of manufacture provides suitable strength and durability of the individual teeth 12 and the rake attachment 8 as a whole. Because the rake attachment 8 is a unitary plate member which can be attached by conventional fasteners, the rake attachment 8 is very cost efficient and inexpensive relative to other prior art attempts. Numerous rake attachments 8 may be plasma cut from steel plate stock, thereby greatly reducing scrap material. Likewise, the plurality of holes 14 can be plasma cut in the same process.

Figure 2:
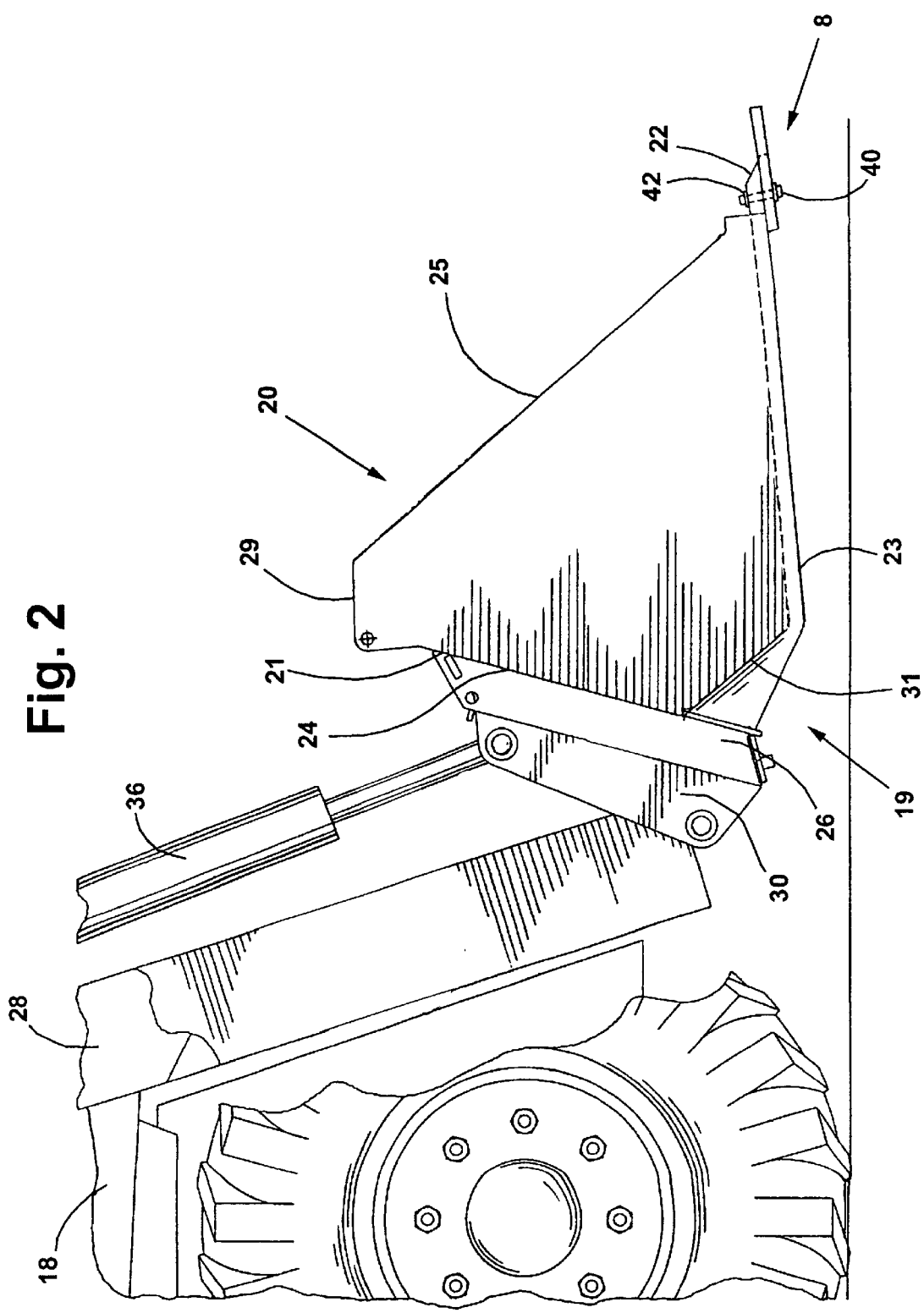
FIG. 2 is a side view of the rake attachment and skid steer according to the present invention.

As shown in FIGS. 2–5, the rake attachment 8 is designed to be fixed to a bucket attachment of a loader. Referring to FIG. 2, the loader 18 includes loader arms 28 and pivot assembly 36. Loader arms 28 and pivot assembly 36 are pivotally mounted to opposing ends of mounting structure 30. A variety of attachments may be mounted onto the mounting structure 30 for use with the loader 18.

The loader arms 28 move upwardly and downwardly, operating to raise and lower whatever attachment is mounted onto mounting structure 30. Pivot assembly 36 extends and retracts, forcing mounting structure 30 to rotate about its point of connection with the loader arm 28. The operability of loader arms 28 and pivot assembly 36 permit the manipulation of mounting structure 30, and thus any attachment fixed to mounting structure 30, in a wide variety of movements and configurations.

Figure 3:
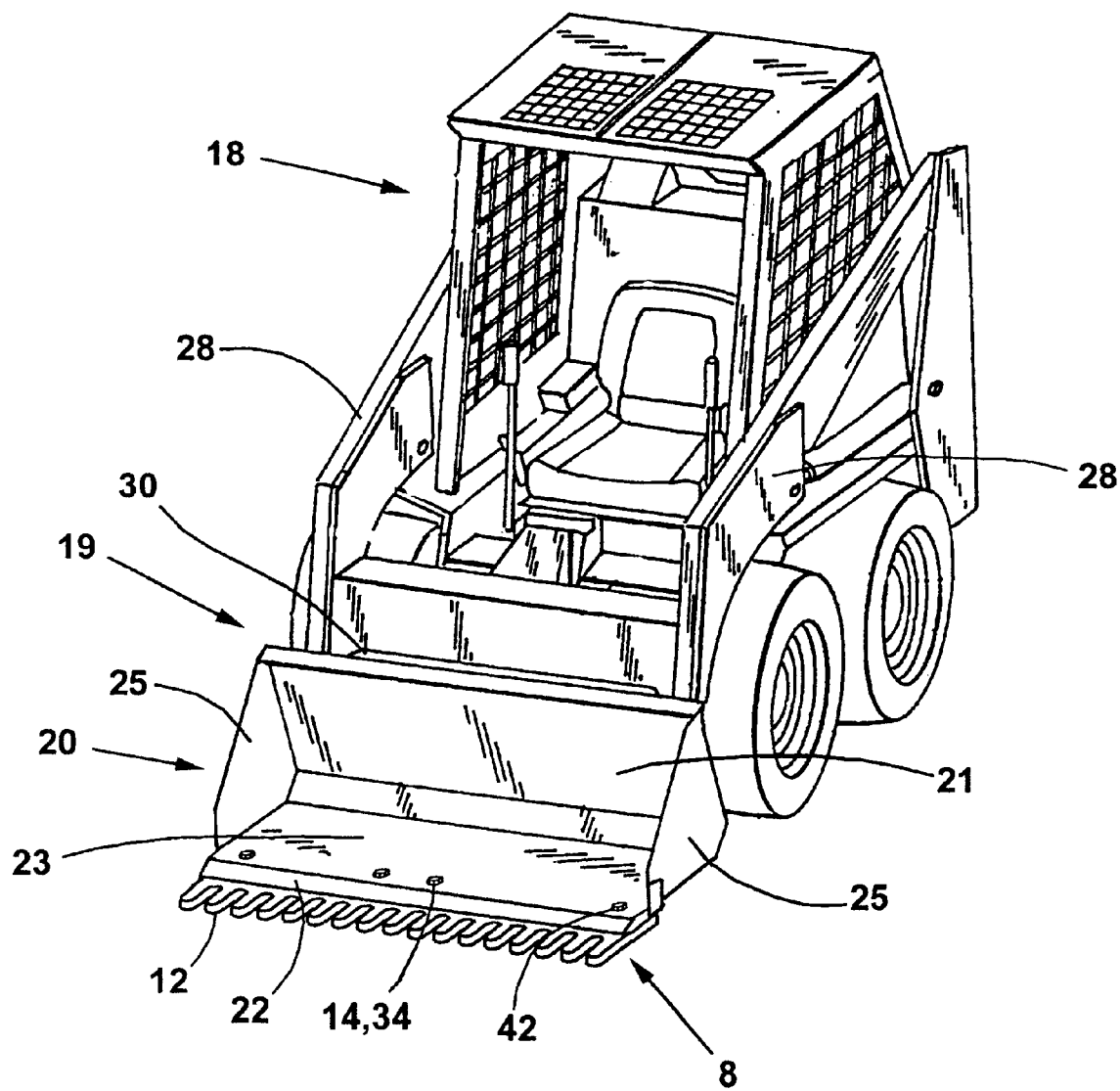
FIG. 3 is a perspective illustration of a skid steer loader having a rake attachment according to the present invention.

A typical bucket attachment 19 comprises a bucket 20 having a rear wall 21, a bottom wall 23 and sidewalls 25. When the loader arms 28 are in their down position, as shown in FIGS. 2 and 3, the rear wall 21 is generally vertical, but may slant forward as shown. A top lip 29 may be fixed to the upper edge of rear wall 21. Although the rear wall 21 is shown as being flat, the rear wall 21 can be curved to form a 'scoop'. In any event, the rear wall 21 extends downwardly towards bottom wall 23 which is generally horizontal. Rear wall 21 can be directly connected to bottom wall 23. In the preferred embodiment, however, and as shown in the figures, rear wall 21 and bottom wall 23 can be interconnected by angled wall 31, which is fixed to a downward edge of rear wall 21 and a rear edge of bottom wall 23. Side walls 25 are generally parallel to one another, and are shaped such that their perimeter corresponds with and is fixed to the side edges of rear wall 21, angled wall 31, and bottom wall 23, thereby enclosing the structure and forming the bucket 20.

The rear wall 21 substantially forms the back side 24 of the bucket 20. Projecting from the back side 24 of the bucket 20 are a pair of brackets 26. The brackets 26 attach to the mounting structure 30 of the skid steer loader 18. The mounting structure 30 may include a quick attach coupler for simple and fast coupling to the brackets 26 of bucket attachment 19. Bottom wall 23 extends beyond the sidewalls 25 to form front lip 22.

The front lip 22 has a bottom surface 27 that extends generally parallel with the bottom wall 23. The thickness of front lip 22 may narrow slightly to form a pointed edge, as shown in FIGS. 2–5, or may remain constant to form a relatively flat edge. Front lip 22 contains a plurality of apertures 34 extending through the lip 22. Bucket attachments come directly from the manufacturer with these apertures formed in the front lip. The apertures are spaced apart by specific dimensions, those dimensions differing only among manufacturers and bucket sizes. Different manufacturers often have different spacing between the apertures, and each manufacturer may vary their own spacing of the apertures along their range of bucket sizes. The widths of different buckets may also vary, and the rake attachments of the present invention can have lengths to correspond with the varying widths of buckets from different commercial manufacturers.

In accordance with an aspect of the present invention, the plate 10 of the rake attachment 8 has universal mounting holes 14, to facilitate mounting the rake attachment to the buckets of different commercial manufacturers, as shown in FIG. 1. The number of holes 14 in the rake attachment 8 generally outnumbers the number of apertures 34 in the front lip 22 of the bucket 20. The spacing of the holes 14 in the rake attachment 8 is designed so that different combinations of holes 14 may be used to create sets that correspond with a variety of different bucket attachments 19. In this way, a single rake attachment 8 can be used for a wide variety of different bucket attachments 19 produced by various manufacturers. For example, in a preferred embodiment illustrated in FIG. 1, the rake attachment 8 contains eight holes 14 extending through the plate 10. However, when affixing the rake attachment 8 to a bucket attachment 19, fewer that eight holes 14 are typically used, e.g., only the outermost and innermost holes 14 (totaling four holes) may be used, as shown in FIG. 3. Therefore, one rake attachment may be used in conjunction with a wide array of different buckets from different manufacturers.

Figure 4:
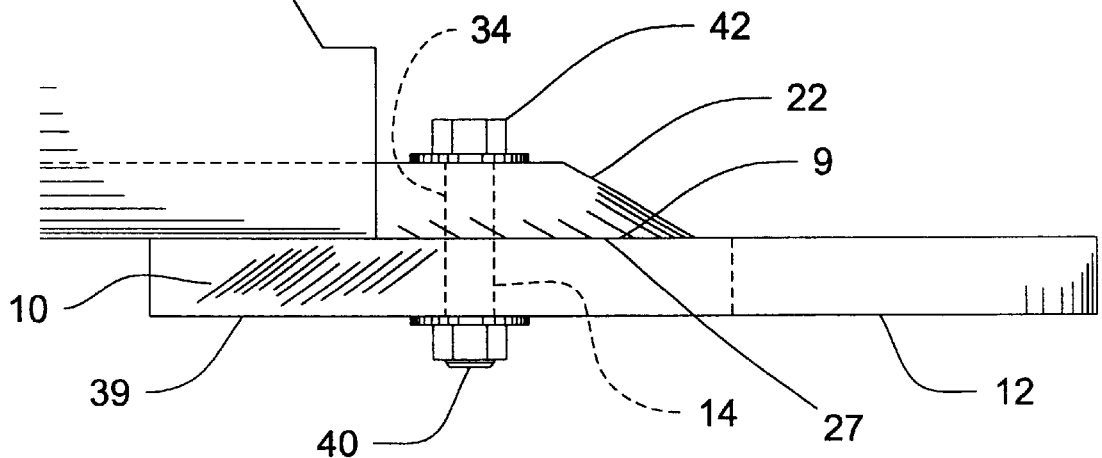
FIG. 4 is an enlarged view of the rake attachment as shown in FIG. 2.

FIG. 3 shows a preferred embodiment in the form of a skid steer loader 18 having a bucket attachment 19. Loader arms 28 extend down in front of the loader 18 and are attached to mounting structure 30. Mounting structure 30 is coupled to the backside 24 of bucket attachment 19 via brackets 26. The front lip 22 contains apertures 34 that are spaced in a specific fashion. The holes 14 of rake attachment 8 are spaced to correspond with the particular bucket attachment 19, based on the manufacturer and bucket size. As best seen in FIG. 4, a plurality of washers, nuts 40 and bolts 42 are used to attach the rake attachment 8 to the bucket attachment 19. With square holes, bolt carriers can be used.

Figure 5:
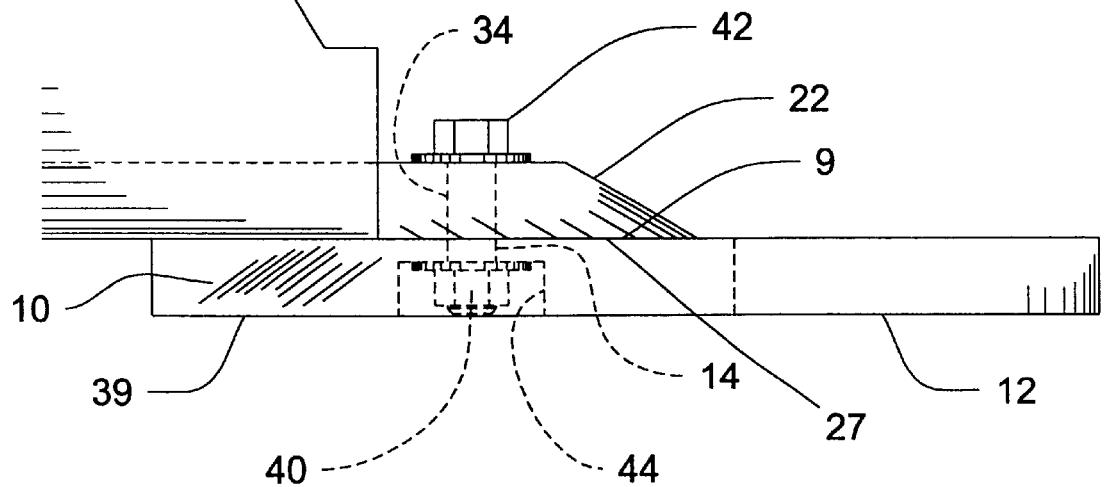
FIG. 5 is an enlarged view of a rake attachment according to an alternative embodiment.

Turning to the alternative embodiment as shown in FIG. 5, the holes 14 in the plate 10 of the rake attachment 8 may also include countersinks 44. The countersinks 44 are located at the bottom surface 39 of the plate 10. The countersinks 44 are sized to receive either the nuts 40 or the heads of bolts 42, as well as their corresponding washers. The depth of the countersinks 44 are designed such that the outer surface of the nuts 40 or bolt heads 42 are flush with the bottom surface 39 of the plate 10 when secured through the corresponding holes 14 and apertures 34. This provides a flat bottom surface which makes the attachment even more practical as the bottom edge of the rake can be used for leveling. This also reduces wear on the fasteners used.

The method of converting a bucket 20 into a rake attachment implement includes the steps of providing the proper rake attachment 8 based on the manufacture and size of the bucket attachment 19, aligning the rake attachment 8 and bucket attachment 19 such that the teeth 12 project from the front of the bucket 20 and such that a select number or all of the holes 14 in the rake attachment 8 are in alignment with corresponding apertures 34 in the front lip 22, and securing the rake attachment 8 to the front lip 22 of the bucket attachment 19. In the preferred embodiment, this last step is accomplished by placing bolts 42 through the apertures 34 and holes 14 of the front lip 22 and plate 10. Nuts 40 are affixed to the distal end of the bolts 42, thereby securing the rake attachment 8 to the front lip 22 of the bucket 20. Although FIGS. 2 and 4 show the nuts 40 below the rake attachment 8, the nuts 40 may also be attached to the bolts 42 at position located above the front lip 22.

Similarly, the rake attachment 8 may be removed from the bucket attachment 19 by removing the nuts 40 and bolts 42. Advantageously this allows the implement to be converted back into a loader bucket, thereby increasing the practicality of the rake attachment. Once removed, the rake attachment 8 may be secured to a second bucket attachment using the method described above if so desired. While the rake attachment of the present invention has been affixed using nuts and bolts, other securing means such as any other suitable fastener may be used. For example, a locking pin using a cotter pin or hinge pin retainer may also be used, as well as many other fasteners well known in the art. Further, the holes 14 in the rake attachment 8 or the apertures 34 in the front lip 22 can be internally threaded to receive the bolts 42, eliminating the need for the nuts 40. Likewise, the holes 14 in the rake attachment 8 can be designed to receive and secure a number pin devices known in the art.

Therefore, the present invention provides a rake attachment that is inexpensive and easy to manufacture. The rake attachment is formed from a single plate of material, providing strength and durability. Further, the rake attachment features a plurality of apertures that can be combined into many different sets, each set corresponding with a specific manufacturer's bucket attachment. As such, one rake attachment can be used with a variety of different bucket attachments for skid steer loaders and front end loaders. The present invention also provides a bucket implement employing the rake attachment. This greatly increases the versatility of the bucket without being cost prohibitive. A method of converting a bucket into a rake attachment is provided, as well as removal and re-installation, that is quick, simple and effective.

What is claimed is:

1. A method of providing a rake attachment implement for a front end loader, the front end loader having a front end and a rear end, the front end loader actuatig a pair of loader arms upwardly and downwardly at the front end, the method comprising:

providing a front end loader bucket mounted to the loader arms at a front end of the front end loader, the front end loader raising, lowering and tilting the front end loader bucket such that the bucket has a first work mode of excavating, dumping and transporting earth material;

converting the front end loader bucket into the rake attachment by attaching an elongated rake having a support plate and a plurality of teeth, the support plate portion being arranged directly on and supported by a longitudinal edge of the front end loader bucket with the teeth projecting forwardly along the longitudinal edge of the front end loader bucket, the front end loader bucket in combination with the enlongate rake providing a second work mode of grading and raking earth material; said teeth being selectively configured for raking and grading; and grading and raking a soil surface with the enlongated rake in combination with the front end loader bucket.

2. The method of claim 1 wherein said attaching comprises fastening and unfastening a plurality of threaded fasteners.

3. The method of claim 2 wherein the threaded fasteners extended through vertically aligned holes in the longitudinal edge of the bucket and the rake.

4. The method of claim 1 wherein the frot end loader is skid steer loader.

5. The method of claim 1 wherein the teeth are integrally connected along an enlongated plate.

6. The method of claim 1 wherein the teeth have flat top and bottom surfaces without a projecting structure secured thereto.

7. The method of claim 6 wherein the teeth have front terminating edges that extend perpendicular between the flat top and bottom surfaces.

8. The method of claim 7 wherein the teeth continuously narrow as the teeth project away from the support plate portion.

9. The method of claim 1 wherein the rake attachment includes at least 15 of the teeth.

10. The method of claim 1 wherein the rake attachment includes at least 20 of the teeth.

11. The method of claim 1 wherein the teeth project in a plane parallel to a bottom surface of the bucket.

12. The method of claim 1 wherein the rake includes between about 4 and about 5 teeth per foot of the length of the enlongate rake.

13. The method of claim 1 wherein the teeth are permanetly secured to the rake attachment and are non-removable.

14. The method of claim 1 wherein the teeth are fixed relative to the front end loader bucket and not movable relative thereto.

* * * * *

UNITED STATES PATENT AND TRADEMARK OFFICE
CERTIFICATE OF CORRECTION

PATENT NO. : 6,360,458 B2
DATED : March 26, 2002
INVENTOR(S) : Randy Dolister

Page 1 of 1

It is certified that error appears in the above-identified patent and that said Letters Patent is hereby corrected as shown below:

<u>Column 16,</u>
Line 31, change "frot" to -- front --.

Signed and Sealed this

Twenty-eighth Day of May, 2002

Attest:

JAMES E. ROGAN
*Attesting Officer*    *Director of the United States Patent and Trademark Office*